(12) United States Patent
Kautz (10) Patent No.: US 11,846,103 B2
(45) Date of Patent: Dec. 19, 2023

(54) SYSTEM AND METHOD FOR MONITORING ROOFTOP ACCESS

(71) Applicant: KAUTZ CONSTRUCTION COMPANY, Lancaster, PA (US)

(72) Inventor: Gordon L Kautz, Columbia, PA (US)

(73) Assignee: Kautz Construction Company, Lancaster, PA (US)

(*) Notice: Subject to any disclaimer, the term of this patent is extended or adjusted under 35 U.S.C. 154(b) by 41 days.

(21) Appl. No.: 17/376,222

(22) Filed: Jul. 15, 2021

(65) Prior Publication Data
US 2022/0056699 A1 Feb. 24, 2022

Related U.S. Application Data

(60) Provisional application No. 63/068,145, filed on Aug. 20, 2020.

(51) Int. Cl.
*E04D 13/00* (2006.01)
*G06Q 10/20* (2023.01)
*G01W 1/10* (2006.01)

(52) U.S. Cl.
CPC ............ *E04D 13/006* (2013.01); *G01W 1/10* (2013.01); *G06Q 10/20* (2013.01)

(58) Field of Classification Search
CPC . B66B 13/00; E04D 13/006; E04D 2001/005; E04B 1/00; E04B 1/3527;
(Continued)

(56) References Cited

U.S. PATENT DOCUMENTS

| 4,317,996 A * | 3/1982 | Davis .................. G01M 3/20 73/40.7 |
| 7,170,998 B2 | 1/2007 | McLintock et al. |

(Continued)

FOREIGN PATENT DOCUMENTS

| CN | 107818402 A | 3/2018 |
| CN | 107833324 A | 3/2018 |

(Continued)

OTHER PUBLICATIONS

Karnak. (Mar. 28, 2019). Care & Maintenance Guidelines: Roof Systems & Coatings. Karnakcorp. Retrieved Jan. 5, 2023, from https://global-uploads.webflow.com/5fdb6a6c2e47643f50c6794c/60109310c33bda2ef6643200_CARE%20%26%20MAINTENANCE%20BROCHURE%20rv%203-28-19%20proof.pdf (Year: 2019).*

(Continued)

*Primary Examiner* — Daniel R Miller
*Assistant Examiner* — Eric Sebastian Von Wald
(74) *Attorney, Agent, or Firm* — Saxton & Stump, LLC (57) ABSTRACT

A system and method for managing maintenance and repair of a commercial building roof that creates an access event log each time a roof location is accessed and precipitation event log is created each time precipitation occurs at the roof location to narrow the search for access events possibly resulting in roof damage causing a roof leak. A centralized computing system accessible by remote computing devices at each rooftop location is accessed to create an access event log when personnel access the roof. The computing system collects weather data for each rooftop location based on the global position coordinates for the rooftop location. Upon discovery of a roof leak, a system query will identify access events occurring since the latest precipitation event after which no leaks were reported to identify a list of potential causes for the roof damage. The system and method may (Continued)

also be used to consolidate roof maintenance, inspection, and repair to improve asset management.

5 Claims, 5 Drawing Sheets

(58) Field of Classification Search
CPC ..... G01W 1/10; G01W 2201/00; G01W 1/02; G01D 2204/22; G01N 2223/647; G05B 2219/36061; G05B 2219/31288; G06Q 10/20; G06F 13/362; G06F 2221/2141; G06F 21/604; G06F 2221/2113; G07C 2209/04; G08G 1/0129; F21V 33/006; H04W 72/0433; H04W 92/12; H04W 88/12; H04W 36/245; H04B 7/2612; H04L 9/088; Y10S 252/964; Y10S 706/931
See application file for complete search history.

(56) References Cited

U.S. PATENT DOCUMENTS

| | | | |
|---|---|---|---|
| 7,487,130 | B2 | 2/2009 | Steele et al. |
| 7,822,709 | B2 | 10/2010 | Godwin |
| 7,869,944 | B2 | 1/2011 | Deaton et al. |
| 9,152,863 | B1 | 10/2015 | Grant |
| 9,424,699 | B2 | 8/2016 | Kusens et al. |
| 10,042,341 | B1 | 8/2018 | Jacob |
| 10,204,193 | B2 | 2/2019 | Koger et al. |
| 10,347,063 | B1 | 7/2019 | LaRovere et al. |
| 10,352,047 | B2 | 7/2019 | Vokey et al. |
| 10,579,028 | B1 | 3/2020 | Jacob |
| 10,643,284 | B2 | 5/2020 | Rogers |
| 2001/0034623 | A1 | 10/2001 | Chung |
| 2003/0171957 | A1 | 9/2003 | Watrous |
| 2005/0021449 | A1 | 1/2005 | Sweeney |
| 2009/0030718 | A1 | 1/2009 | Bengson |
| 2009/0174768 | A1 | 7/2009 | Blackburn et al. |
| 2009/0216552 | A1 | 8/2009 | Watrous |
| 2012/0271673 | A1 | 10/2012 | Riley |
| 2014/0244695 | A1 | 8/2014 | Battcher et al. |
| 2015/0269830 | A1* | 9/2015 | Beldon ................ G08B 21/182 340/666 |
| 2017/0228953 | A1* | 8/2017 | Lupovici ............ G07C 9/00896 |
| 2018/0336418 | A1* | 11/2018 | Splittstoesser ......... G06V 20/39 |
| 2019/0127985 | A1* | 5/2019 | Dundorf .............. G05D 1/0038 |
| 2019/0279307 | A1 | 9/2019 | Gillespie |

FOREIGN PATENT DOCUMENTS

| | | |
|---|---|---|
| CN | 108386079 A | 8/2018 |
| CN | 110705826 A | 1/2020 |
| GB | 2464517 A | 4/2010 |
| JP | 2004233142 A | 8/2004 |
| WO | 2020122990 A1 | 6/2020 |

OTHER PUBLICATIONS

Coddington, K. (Aug. 27, 2018). Your Preventative Commercial Roof Maintenance Checklist. Torc: The Original Roofing Company. Retrieved Jan. 11, 2023, from https://www.theroofingcompanylasvegas.com/blog/commercial-roof-maintenance-checklist (Year: 2018).*

* cited by examiner

SYSTEM AND METHOD FOR MONITORING ROOFTOP ACCESS

CROSS-REFERENCE TO RELATED APPLICATIONS

This application claims the benefit of priority to provisional patent application Ser. No. 63/068,145 filed on Aug. 20, 2020.

BACKGROUND OF THE INVENTION

The present invention relates generally to systems and methods for monitoring and controlling personnel access to designated areas or spaces, and, more particularly to a system for monitoring and controlling access to a rooftop area which also monitors precipitation events to assist in monitoring the roof surface condition and identifying potential causes of roof leaks.

Commercial building rooftops provide far more than shelter from weather. Numerous commercial building systems locate equipment on commercial rooftops as a way to conserve valuable area on the ground, hide the equipment from customer view, and to limit personnel access to these components though locked access hatches inside the building. Typical components may include HVAC system condensers or chillers, cooking exhaust hoods, electrical equipment, area lighting and/or signage. Servicing this equipment may involve multiple individual service providers, each requiring periodic access to the roof top where the equipment is located.

Materials used for commercial rooftop, while generally durable, are not design for regular personnel traffic. Moreover, the roof surface may be easily damaged, even if accidentally, by events as small as dropping a tool onto the surface. Damage to the roof surface inevitably leads to water intrusion which increases building repair costs, both repairs to the roof surface itself and the aftermath of water damage inside of the building.

Many commercial buildings lack sophisticated controls for personnel access to the building roofs. A service provider requiring access typically notifies a manager or other employee in the building and accesses the roof. Some businesses may keep roof secured by lock, but gaining access simply means obtaining a key from a manager in charge of the business within the building. Records of the service call may or may not be kept.

Roof damage caused by personnel on the roof is not normally discovered until the next significant rain event during which a roof leak signals that damage has occurred. In the absence of records of who has been on the roof or when, attributing the cost of the damage to the service contractor that caused it is impossible. The cost of roof repairs is thus typically borne by the building owner.

It would be advantageous to provide a system and method for managing and monitoring access to a roof area of a building to facilitate investigation of causes of damage thereto. Automation of the process would enhance its monitoring capabilities as well as minimizing the impact on building maintenance activities. Further advantages would be realized by a system that monitored precipitation at the building location to establish a probable timeframe for potential damages to the roof after given access to the roof.

SUMMARY OF THE INVENTION

Accordingly, the present invention, in any of the embodiments described herein, may provide one or more of the following advantages:

It is an object of the present invention to provide a system and method for managing maintenance and repair of a commercial building roof. The system monitors personnel access to the roof, precipitation events, and reports of roof leaks to correlate reported roof leaks with personnel access that might have contributed to the leak. Roof access via a locked roof access hatchway requires a key, the key being provided with an identifier code for accessing a database in which access information is maintained. Service personnel requiring access must access the database and record information identifying the service provider, purpose of the access, and any irregularities to obtain the key for access. The system automatically notes date and time of the service visit. Access to the database may be conveniently provided using a scannable code which directs the service personnel to the database to create an access entry specific for the building and the service visit.

It is also an object of the present invention to provide a system and method for monitoring personnel access to a commercial building roof to improve identification of the causes of leaks in the roof. A roof access system includes a database into which records are added by individuals accessing the roof. Each record includes identification of the specific building/roof, date, identification of the personnel accessing the roof, and the reason for the access. The system may also receive weather input for the building location, specifically recording precipitation events to correlate roof access with discovery of roof leaks to assist in discovering causes of the leaks. Weather information input to the database is preferably automated.

It is a further object of the present invention to provide a system and method for managing the condition of a roof on a commercial building by creating a database into which is recorded a summary of all access to the roof. The database includes identifying information for each building roof that is managed within the system, including location coordinates. A database record is created when personnel access any roof within the system to perform inspections, maintenance, or repairs of any equipment located on the building roof. Access to the roof may be linked to creation of the database record by controlling access to the key for a roof access hatch. The access control may be procedural, implemented by a building manager limiting access to the key, or it may be automated requiring service personnel to access the database and initiate the event record before the access hatch is unlocked. A scannable code may be provided which service personnel may scan to access the database and create the entry record for the service call. Database records for precipitation events are also created to more readily identify activities on the roof immediately preceding notification of a roof leak and assign accountability to entities responsible for damage causing the leaks.

These and other objects are met by a system and method for managing maintenance and repair of a commercial building roof that creates an access event log each time a roof location is accessed and precipitation event log is created each time precipitation occurs at the roof location to narrow the search for access events possibly resulting in roof damage causing a roof leak. A centralized computing system accessible by remote computing devices at each rooftop location is accessed to create an access event log when personnel access the roof. The computing system collects weather data for each rooftop location based on the global position coordinates for the rooftop location. Upon discovery of a roof leak, a system query will identify access events occurring since the latest precipitation event after which no leaks were reported to identify a list of potential causes for the roof damage. The system and method may also be used to consolidate roof maintenance, inspection, and repair to improve asset management.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. The various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all figures.

Figure 1:
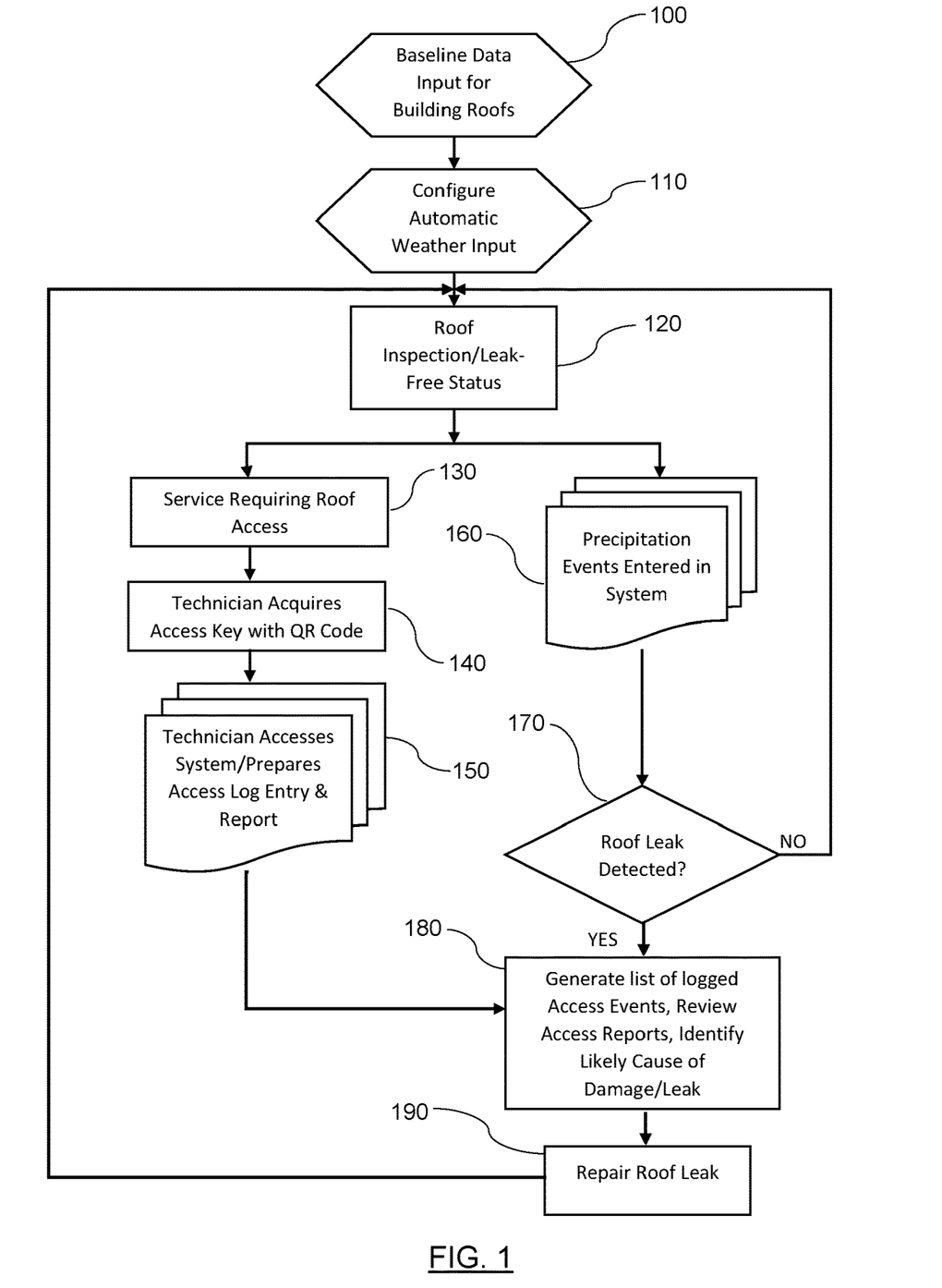
FIG. 1 is a flow chart illustrating a system and method for managing maintenance and repair of a commercial building roof by monitoring personnel access to the roof embodying the present invention.

FIG. 1 presents a flow chart illustrating the process of managing maintenance and repair of commercial building roofs by monitoring personnel access to each roof location. Initial data input 100 for each roof location monitored by the system is first added to the database. Baseline information identifying the building, owner, location, global positioning coordinates, size and type of the roof, age of the roof, and any other information that might benefit roof maintenance and the monitoring program is entered. Each building/roof location is assigned a unique identifier consistent with normal database management practices. Data specific to each roof location may then easily be accessed using the unique identifier or other searching criteria.

Using the location of each building, the database is configured to receive weather input 110, specifically precipitation events 160, occurring at each roof location in the system. Third-party commercial weather services may be used to automatically provide precipitation data to the system so that precipitation events may be entered into the database for each roof location in the database. A threshold may be applied so that only precipitation events 160 exceeding an amount that is likely to breach a damaged roof (e.g., 0.25 inches in a 24-hour period) are entered into the database.

The database may also include photographs of the roof and condition assessments reflecting the then current state of the roof on specific points in time.

Maintenance and repair records for the building roof location may be added to the database. Maintenance records may include service calls for equipment located on the roof and inspection reports for equipment or roofing. Developing a comprehensive log of the material condition of the roof, repairs, precipitation history, and personnel access history, allows the system to be used for identifying potential sources of damage to the roof surface leading to leaks and to assist in preventative maintenance and roof replacement planning. Minimally, each roof should be inspected 120 as it is entered into the database. Damage should be repaired, if necessary, to provide a known, leak-free baseline in the system.

Figure 5:
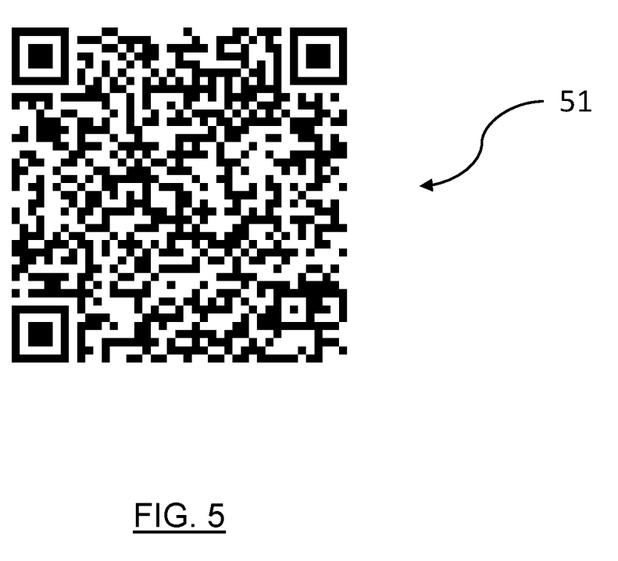
FIG. 5 shows an exemplar scannable code used for accessing the system of the present invention using a portable remote computing device.

A key aspect in relation to roofing maintenance is to maintain a log of all personnel accessing the roof and the purpose of their access. Access to building roofs is generally controlled by a locked access hatch inside the building or a lock ladder outside of the building. Requiring all personnel who need to access the roof 130 to initiate and complete a roofing access record 160 in the system as a prerequisite to being granted access greatly improves the integrity of the maintenance log. The access report is initiated when the personnel access the system 140 using a scannable code available at the roof location. In one embodiment, the unique identifier for the roof location is associated with a scannable code 51 (e.g., a Quick Response or "QR" code) that may be provided to the service or maintenance technician along with the keys for roof access. An exemplar scannable code 51 is shown in FIG. 5. Such a code is easily provided on a fob attached to the access key(s). A technician using a code scanner application for a smart phone or similar portable device can access the database via the internet and generate a new access visit record in the database upon arrival at the roof location. The scannable code might also be provided on a label or the like located adjacent to the roof access location.

Once scanned, the system creates a new access log entry into which the technician is required to enter identifying information for the service vendor, purpose for the service call, and, at the completion of the visit, identify any anomalies or other occurrences that might have caused damage to the roof (e.g., a tool dropped onto the roof). The system may also allow the service technician to supply photos of the roof, whether to confirm as-found or as-left conditions or simply to bring issues to the attention of the building owner or the roof maintenance contractor.

The system may provide a confirmation notification to the building manager and/or roofing monitoring entity that a roof access log report has been initiated and/or completed to assist the building manager and/or roofing monitoring entity in monitoring activities occurring at the building location and assuring compliance with the system requirements.

Reports of leaks 170 are also entered into the database system as the leaks are identified. These may be entered by a building manager or other employee at the location by accessing the system using a remote terminal, such as an internet-connected computer. Upon entry of a leak report, the system may automatically initiate a service request to a roofing vendor. Data in the system including precipitation events, maintenance and repair allows a timeline of events leading up to the discovery of the leak to be determined. Assuming that a leak would be reported following a precipitation event, the system can produce a potential cause report 180 identifying all roof access activities that occurred prior to the precipitation event that resulted in the leak report but after precipitation events that did not result in a leak report. Reviewing the potential cause report enables the most likely causes of the leaks to be identified and the responsible parties held accountable for repairs 190 to the roof damage.

Figure 2:
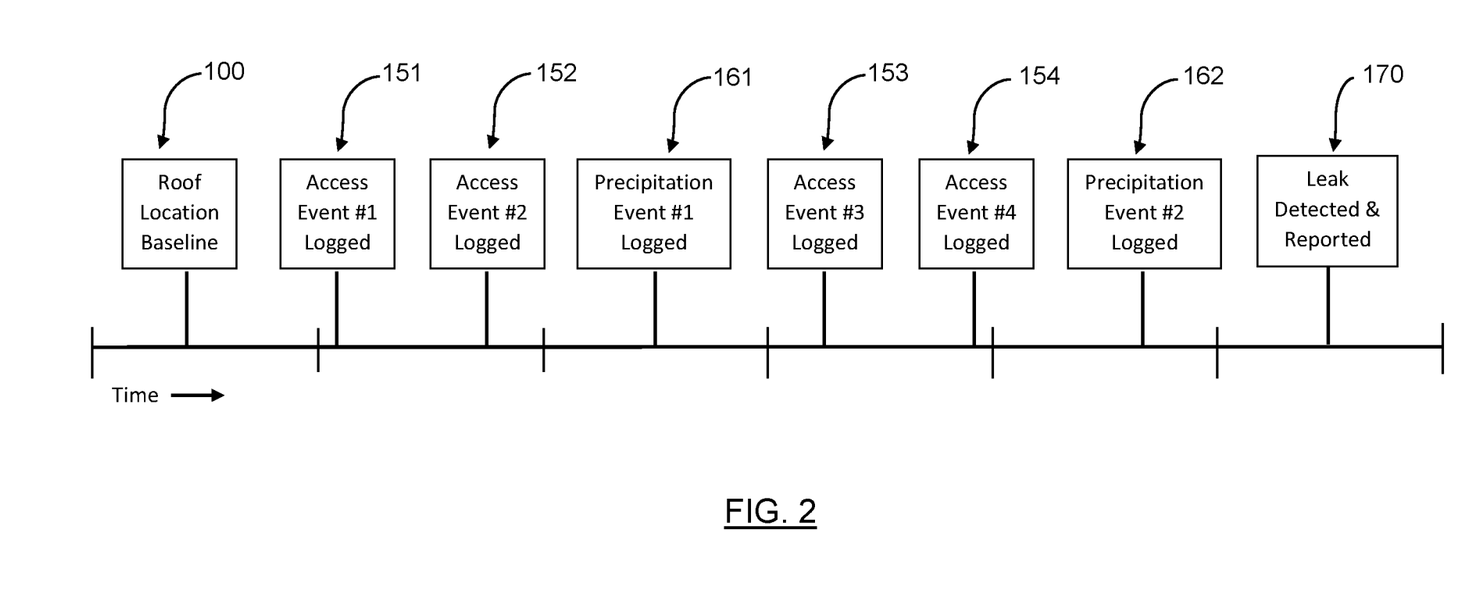
FIG. 2 illustrates a timeline of events typically occurring in the system and method for managing a building roof using the present invention.

FIG. 2 illustrates a timeline of based on the above description. In the exemplar figure, investigating the cause of the reported roof leak would focus on access events 153, 154 occurring during the period between precipitation events 161, 162. Access events 151, 152 which occurred prior to precipitation event 161 did not result in detected roof leakage and are less likely to have been a contributing factor in the detected leak.

Figure 3:
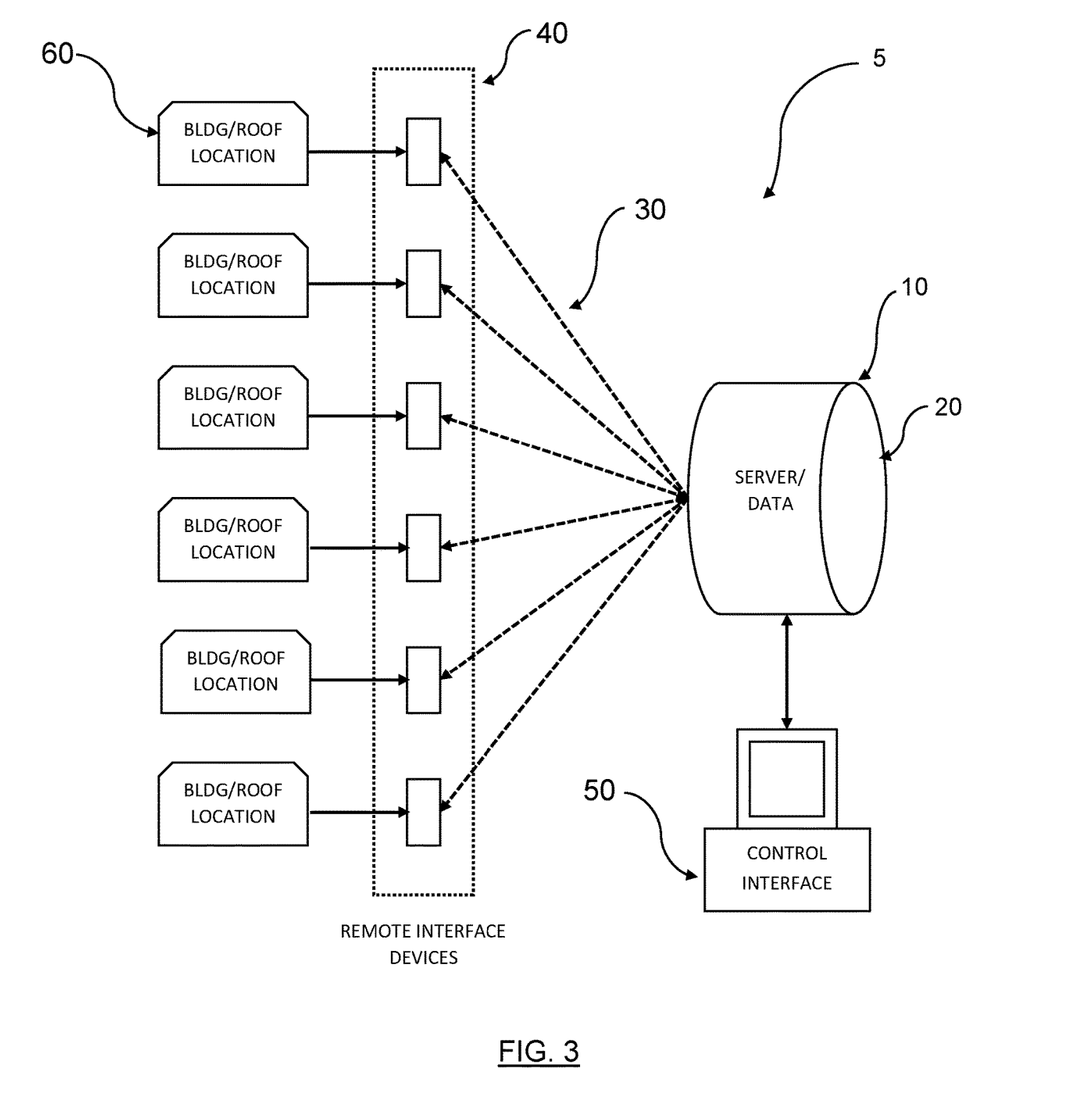
FIG. 3 is a diagram of the basic architecture of one embodiment of the system for implementing the method of the present invention.
Figure 4:
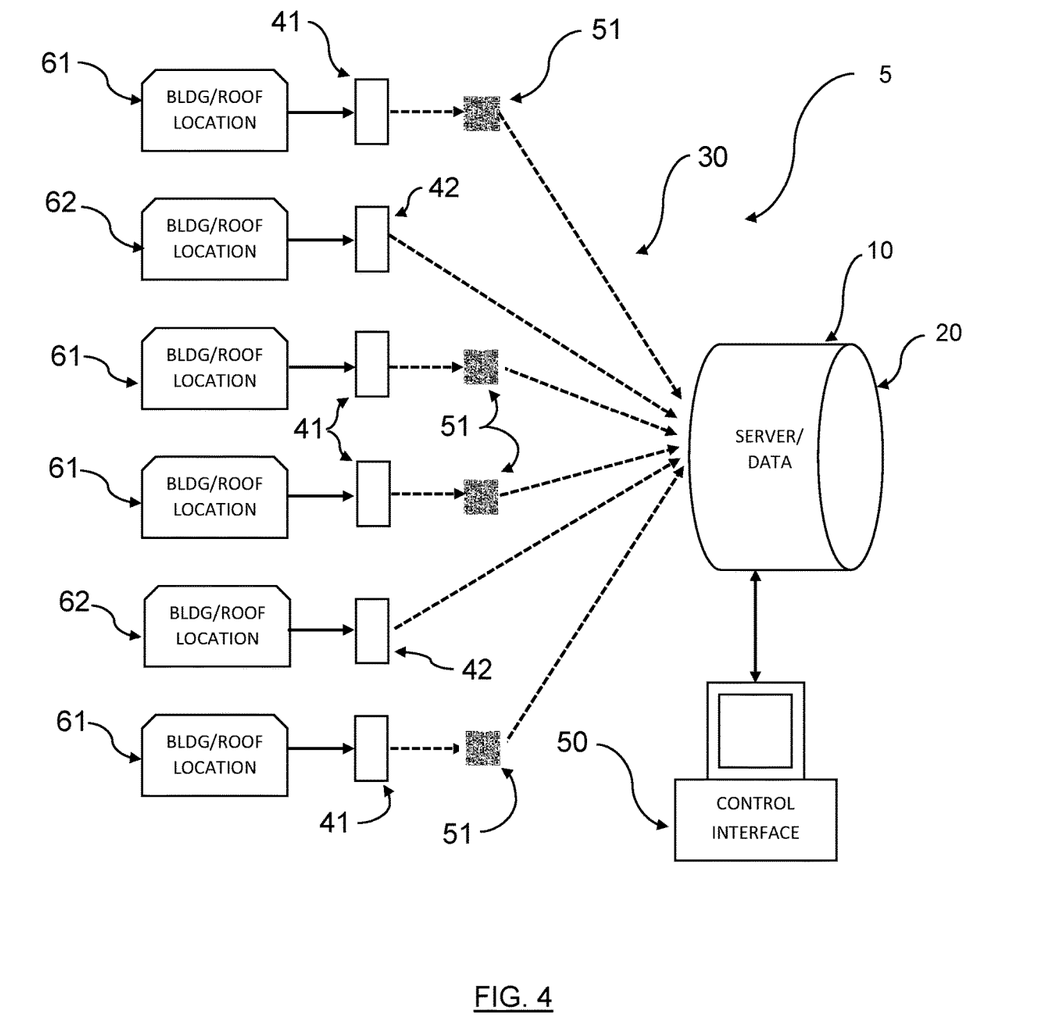
FIG. 4 is a diagram illustrating the means of accessing the computing system embodying the resent invention.

A diagram of a representative monitoring system 5 for implementing a process to manage maintenance and repair of a commercial building roof by monitoring personnel access to the roof is shown in FIG. 3. The system 5 comprises a computing system 10, a data storage system 20, and a network means 30 for data input and output exchange between the computing system 10 and a plurality of remote interface devices 40. The system 5 may be implemented using the internet wherein the computing system 10 and data storage system 20 functions are fulfilled by an on-line server and database accessible using software and the interface device 40. The interface devices 40 can be any portable computing device or apparatus capable of accessing the system server over the internet such as a computer or a smart phone. FIG. 4 illustrates the connection of the remote interface devices 40 to the computing system 10. Roof locations 62 may provide remote interface devices 42 that are pre-configured to communicate with the computing system. Roof locations 61 provide a scannable code 51 that when entered into a portable computing device 41 connects to the computing system 10. A software application operable on the remote interface device 41 (e.g., a smart phone) streamlines the interface for convenience of the service personnel. Service personnel may be a repair or service technician servicing roof-mounted equipment at the roof location 60, the building owner/manager, or the roof maintenance contractor. It is noted that most smart phones and tablets may be used to scan a QR code (FIG. 5) which will then automatically load a pre-defined internet URL. As more companies incorporate tablet/smart phone application into normal work processes, it becomes increasingly likely that personnel requiring access to the roof will have the necessary technology available. This preferred interface provides ease of use that is desirable; simplifying access to the system improves the likelihood of compliance by all personnel requesting access to a particular roof within the system.

It is recognized that some service personnel may not have access to the necessary hardware/software that allows access to the monitoring system 5. Building owners or operators could easily provide access to a remote interface device in the form of a tablet or computer workstation so that the service technician could complete the access entry form.

Leaks are reported by a building manager or other employee at the location when detected. Reporting may be by contacting the operator/manager of the computing system or by interfacing directly with the database using a remote interface device. Creating a leak report for the rooftop location may have an interface that differs for the access log interface to solicit the information necessary to evaluate the leak and determine a potential cause. Once reported, the access event logs and the precipitation event logs may be queried by the computing system to identify access events occurring since a previous precipitation event for which no leaks were reported. This query identifies personnel who accessed the roof location and the work performed and may identify activities with the potential to have damaged the roof and caused the leak. The query is preferably performed by a roofing manager charged with responsibility for the rooftop monitoring computing system. A control interface 50 is provided to enable such queries as well as to conduct software maintenance and updates to the system. The control interface may connect to the computing system via the internet.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A method for monitoring access to a rooftop area and identifying potential causes for leaks comprising the steps of:

providing a computing system;

providing a data storage system operably managed by the computing system and configured for receiving and storing information for the rooftop area, the information including at least global position coordinates of the rooftop area, an access event log for the rooftop area, a rooftop leak log, and a weather event log for the rooftop area;

providing a weather event monitoring system configured to identify precipitation events occurring at the rooftop area and communicate precipitation event data to the weather event log;

configuring the computing system to receive precipitation data for the global position coordinates of the roof top area and communicate precipitation data for the global position of the rooftop area and communicate precipitation data to the weather event log, the precipitation data including at least a precipitation date and a precipitation amount;

providing a remote interface apparatus comprising a scannable image proximate to an access location for the rooftop area, the scannable image readable by a portable computing device;

scanning the scannable image by a technician using the portable computing device, the scannable image when read by the portable computing device configuring an interface with the computing system and creating an entry in the access event log;

completing by the technician the access event log entry by entering data representative of access date, identity of the technician accessing the rooftop area, and purpose for accessing the rooftop area;

reporting roof leak data by personnel using the remote interface apparatus communicatively coupled to the computing system to enter the roof leak data into the rooftop leak log; and determining by querying the computing system a list of access events occurring prior to the reported roof leak and generating an output report of the list to aid in identifying potential causes of the rooftop leak.

2. The method of claim 1, further comprising the step of:

entering by the remote interface device a baseline date at which the rooftop area was known to be leak free;

entering by the computing system the baseline date in the data storage system; and determining by the computing system a list of access events a list of access events occurring prior to the reported roof leak and subsequent to the baseline date.

3. The method of claim 1, further comprising the step of:

determining by the computing system whether the precipitation amount exceeds a predetermined threshold value and communicating precipitation data to the weather event log only if the threshold value is met or exceeded.

4. The method of claim 1, wherein the portable computing device is a portable computer, tablet, or smartphone executing a software application to configure the interface with the computing system.

5. The method of claim 1, wherein the scannable image is a quick response code.

* * * * *